United States Patent [19]
Kobayashi

[11] Patent Number: 5,289,320
[45] Date of Patent: Feb. 22, 1994

[54] APPARATUS FOR DEFINING A POSITION OF A LENS

[75] Inventor: Takumi Kobayashi, Sakado, Japan

[73] Assignee: Asahi Kogaku Kogyo Kabushiki Kaisha, Tokyo, Japan

[21] Appl. No.: 821,072

[22] Filed: Jan. 16, 1992

[30] Foreign Application Priority Data

Jan. 23, 1991 [JP] Japan ............................ 3-024992[U]

[51] Int. Cl.⁵ .......................... G02B 7/02; G03B 17/00
[52] U.S. Cl. .................... 359/819; 359/823; 354/286
[58] Field of Search ............................ 359/811–830; 372/108; 354/286

[56] References Cited

U.S. PATENT DOCUMENTS

| | | | |
|---|---|---|---|
| 3,049,970 | 8/1962 | Steinberg | 359/827 |
| 4,088,396 | 5/1978 | Edelstein | 359/822 |
| 4,442,524 | 4/1984 | Reeder et al. | 372/108 |
| 4,487,495 | 12/1984 | Kimata et al. | 354/403 |
| 4,720,167 | 1/1988 | Okura | 359/819 |

FOREIGN PATENT DOCUMENTS

| | | | |
|---|---|---|---|
| 889520 | 12/1988 | European Pat. Off. | 359/819 |
| 177815 | 4/1986 | Fed. Rep. of Germany | 359/813 |
| 54-71626 | 6/1979 | Japan . | |
| 9328 | of 1910 | United Kingdom | 359/827 |

OTHER PUBLICATIONS

English Language Abstract of Japanese Publication No. 54-71626.

*Primary Examiner*—Bruce Y. Arnold
*Assistant Examiner*—Thong Nguyen
*Attorney, Agent, or Firm*—Sandler Greenblum & Bernstein

[57] ABSTRACT

A lens position definition apparatus is provided in, for example, a camera. The apparatus includes a base member, a cam mechanism for controlling a position of the lens relative to the base member along a direction of an optical axis thereof in accordance with a rotational position thereof about the optical axis, and at least one spring for urging the lens in a direction inclined to the direction of the optical axis and the rotation thereof, in order to enable the cam mechanism to operate.

9 Claims, 3 Drawing Sheets

APPARATUS FOR DEFINING A POSITION OF A LENS

BACKGROUND OF THE INVENTION

The present invention relates to an apparatus for defining a position of a lens, more specifically, to an improvement of an apparatus for defining a position of a lens along the direction of an optical axis and a rotation thereof in order to control a position of a lens relative to a camera body in the direction of the optical axis.

A camera having an auto-focusing device is known in which a lens actuating member to which a lens is attached is rotatably supported on a cylindrical member for movement about an optical axis thereof, and the lens actuating member and cylindrical member are interconnected through a cam mechanism. The cam mechanism is provided with a cam which is formed on the cylindrical member and a protrusion which is provided on the lens actuating member and engaging with the cam. When the lens actuating member rotates about the optical axis of the lens in accordance with the result of measuring the distance between the camera and the object to be photographed, the position thereof in the direction of the optical axis is changed in accordance with a profile of the cam, thereby adjusting the focal length of the lens. In order to cause the protrusion of the lens actuating member to always contact the profile surface of the cam, a first spring for urging the lens actuating member in the direction of the optical axis and a second spring for urging it in the rotating direction are provided between the lens actuating member and camera body.

The first spring, however, is provided in front of the lens actuating member to urge it toward the cam which is provided behind thereof. Accordingly, the total length of a lens part incorporated with the cylindrical member and lens actuating member in the direction of the optical axis is enlarged. Furthermore, it should be necessary to employ the first and second springs to accomplish the auto-focusing operation. It should noted that the camera includes a camera body which has a main body in which film is loaded and a lens cover which is integrally attached to the front surface of the main body and in which the lens enclosed in the cylindrical member is contained.

As a result, in the conventional camera with the first and second springs, a protruding amount of the lens cover from the front surface of the main body is relatively large, so that it is difficult to make the conventional camera compact.

SUMMARY OF THE INVENTION

The present invention was conceived in view of the above-mentioned circumstances, and it is therefore a primary object of the present invention to provide an apparatus for defining a position of a lens, which eliminates a space for arranging a spring for urging the lens in a direction of the optical axis, thereby rendering the camera to be made in more compact.

It is therefore another object of the present invention to provide an apparatus for defining a position of a lens, which shortens the protruding amount of the lens cover from the front surface of the main body, thereby allowing the camera to be constructed in more compact form.

In order to accomplish the above-mentioned objects according to a first aspect of the present invention, there is provided a lens position definition apparatus which comprises a base member, control means for controlling a position of the lens relative to the base member in a direction of an optical axis thereof in accordance with a rotational position thereof about the optical axis, and at least one spring for urging the lens in a direction inclined to the direction of the optical axis and the rotation thereof, in order to enable the control means to operate.

According to a second aspect of the present invention, the control means includes a lens actuating member in which the lens is enclosed and which is movable along the direction of the optical axis of the lens and rotatable about the optical axis thereof, and a cam mechanism which is provided between the base plate and the lens actuating member so as to regulate the position of the lens actuating member along the direction of the optical axis in accordance with the rotational position of the lens actuating member.

According to a third aspect of the present invention, the base plate has a cylindrical supporting portion coaxial with the optical axis of the lens, and said lens actuating member has a cylinder portion fitted into the supporting portion and set to be slidable therein along the direction of the optical axis and rotatable about the optical axis.

According to a fourth aspect of the present invention, the cam mechanism includes at least one axial protrusion formed on the outer peripheral surface of the cylinder portion, and at least one cam surface formed on the distal end surface of the supporting portion and being capable of engaging the axial protrusion.

According to a fifth aspect of the present invention, the axial protrusion is urged to contact the cam surface or the distal end surface by the spring.

According to a sixth aspect of the present invention, the spring is coupled to the distal end of said cylinder portion at one end, and connected to said base plate.

According to a seventh aspect of the present invention, the spring is tilted such that the central axis thereof is set to be inclined relative to both directions of the optical axis and the rotation of the lens.

According to an eighth aspect of the present invention, there are provided a plurality of said springs.

According to a ninth aspect of the present invention, each of said springs is tilted such that the central axis thereof is set to incline relative to both directions of the optical axis and the rotation of said lens.

According to a tenth aspect of the present invention, the springs are equiangularly arranged around the lens.

According to an eleventh aspect of the present invention, there is provided an apparatus for driving a focusing lens adapted to be used in a camera with an auto-focusing device. The apparatus comprises means for moving the focusing lens in a direction along an optical axis thereof by causing the focusing lens to rotate about the optical axis, and means for urging the focusing lens in a direction inclined to the directions of the optical axis and the rotation thereof.

The above and other objects, features and advantages of the present invention will become apparent from the following detailed description which is to be read in conjunction with the accompanying drawings.

DETAILED DESCRIPTION OF PREFERRED EMBODIMENT

Hereinafter, a lens position definition apparatus of one embodiment according to the present invention will be described in detail with reference to the drawings.

Figure 1:
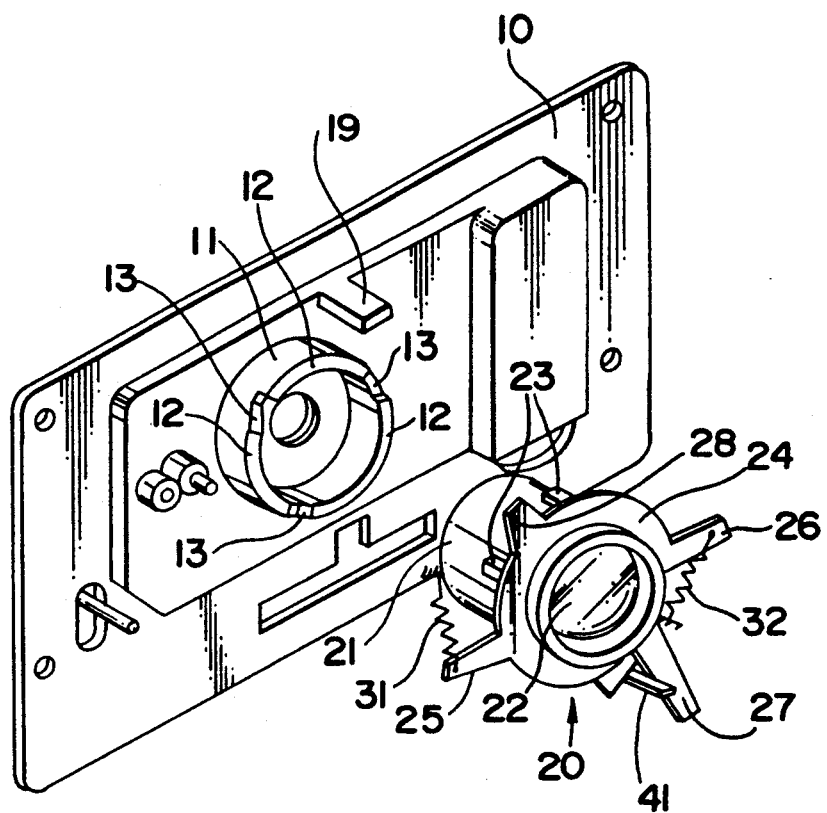
FIG. 1 is an exploded perspective view showing a lens position definition apparatus of one embodiment according to the present invention.

FIG. 1 shows a shutter control apparatus equipped with a lens position definition apparatus of one embodiment according to the present invention.

In FIG. 1, the lens position definition apparatus is provided with a base plate 10 which is fixed to a front surface of a camera body (not shown) by screws. On the front surface of the base plate 10, a cylindrically shaped supporting portion 11 which has a central axis substantially aligned with an optical axis is integrally formed. The front end surface of the supporting portion 11 is constructed by an arcuate flat surface portion 12 parallel to the front surface of the base plate 10, and a plurality of recesses 13 equiangularly formed on the flat surface portion 12.

Figure 2:
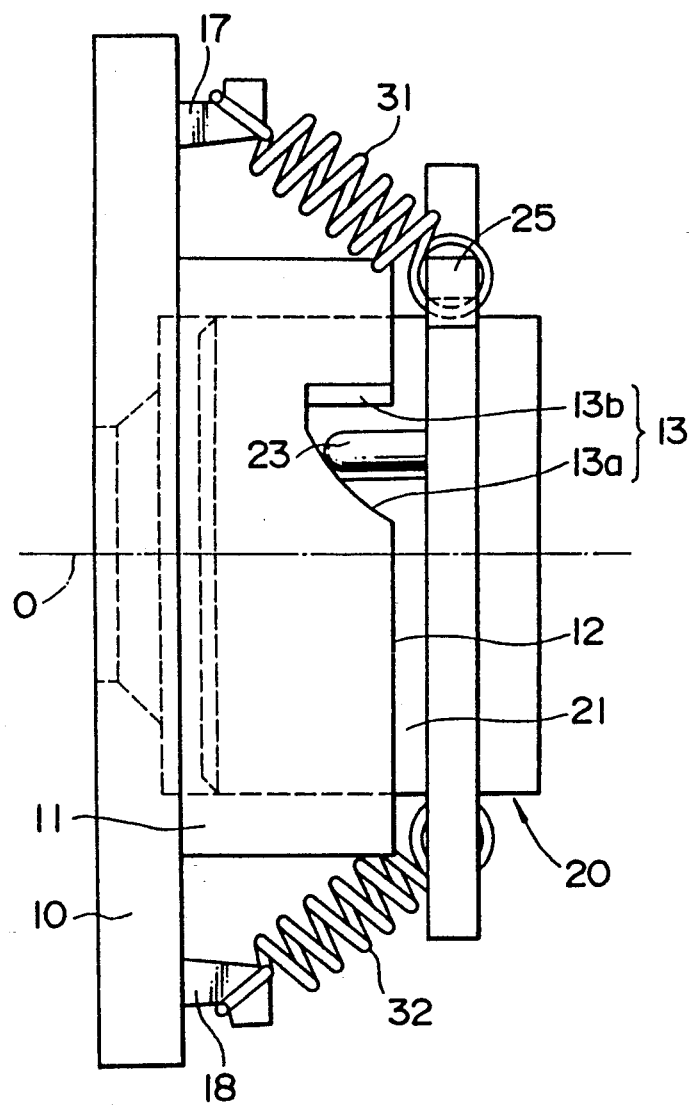
FIG. 2 is a side view showing a drawn-in (i.e., contracted) condition of the lens.

In this embodiment, three recesses 13 are arranged and are 120 degrees apart. As shown in FIG. 2, each recess 13 is comprised of a slant cam surface 13a and an upright surface 13b which is perpendicular to the flat surface portion 12. The depth of the cam surface 13a from the flat surface portion 12 is set to be gradually increasing in a clockwise direction.

A lens actuating member 20 includes a cylinder portion 21 in which a lens 22 is contained, and by aligning the optical axis thereof with the central axis of the cylinder portion 21. The cylinder portion 21 is slidably fitted in the cylindrical supporting portion 11. Accordingly, the lens actuating member 20 is set to be rotatable about the optical axis of the lens 22 as well as movable along a direction of the optical axis.

The lens actuating member 20 further includes a plurality of axial protrusions 23 on the outer circumferential surface of the cylinder portion 21, each of which extends to be parallel to the optical axis, and each axial protrusion 23 also has a rounded back side end. In this embodiment, three axial protrusions 23 are equiangularly arranged corresponding to the three recesses 13. The rounded ends of the axial protrusions 23 always contact the front end surface of the supporting portion 11 by means of springs 31 and 32 (described hereinafter).

Accordingly, the lens actuating member 20 is displaced in the direction along the optical axis in accordance with the angular position thereof, when it rotates about the optical axis thereof. That is, the axial position of the lens actuating member 20 is changed according to the shape (i.e., the profile) of the front end surface of the supporting portion 11. It should be noted that a cam mechanism in this embodiment is constituted by the front end surface of the supporting portion 11 and protrusions 23.

A flange portion 24 is integrally formed on the outer periphery of the front end portion of the lens actuating member 20. A pair of first and second arms 25 and 26 which extend in radial directions of the lens actuating member are provided to the outer periphery of the flange portion 24. The extending directions of these first and second arms 25 and 26 are opposite to each other, whereby the first and second arms 25 and 26 are aligned. In other words, these first and second arms 25 and 26 are attached to the flange portion 24 in positions where these evenly divide the outer periphery of the lens 22.

The first and second arms 25 and 26 are connected to the camera body through springs 31 and 32, respectively. The central axes of the springs 31 and 32 are set to be inclined relative to both directions of the optical axis of the lens 22 and the rotation of the lens actuating member 20. That is, the springs 31 and 32 urge the lens actuating member 20 to rotate it in a clockwise direction in FIG. 1 or as viewed from the lens side, as well as to displace (or retract) the lens toward the supporting portion 11. Accordingly, the axial protrusions 23 always contact the front end surface of the supporting portion 11.

A third arm 27 which extends radially is integrally formed on the outer periphery of the flange portion 24 between the first and second arms 25 and 26, especially, in a position where it is displaced in counterclockwise direction by a predetermined angle from the first arm 25. The third arm 27 is capable of contacting a protrusion of a lens drawing mechanism 41 (not shown). The lens actuating member 20 is rotated in a counterclockwise direction against the urging force of the springs 31 and 32 by means of contact between the third arm 27 and the protrusion of the lens drawing mechanism 41.

A fourth arm 28 which also extends radially is integrally formed on the outer periphery of the flange portion 24 between the first and second arms 25 and 26, especially, in a position where it is displaced in a counterclockwise direction by a predetermined angle from the second arm 26. The fourth arm 28 is capable of contacting a stopper member 19, which is formed on the base plate 10. The lens actuating member 20 is restricted to the rotation in the clockwise direction and is urged by the springs 31 and 32, when the fourth arm 28 contacts the stopper member 19.

Figure 3:
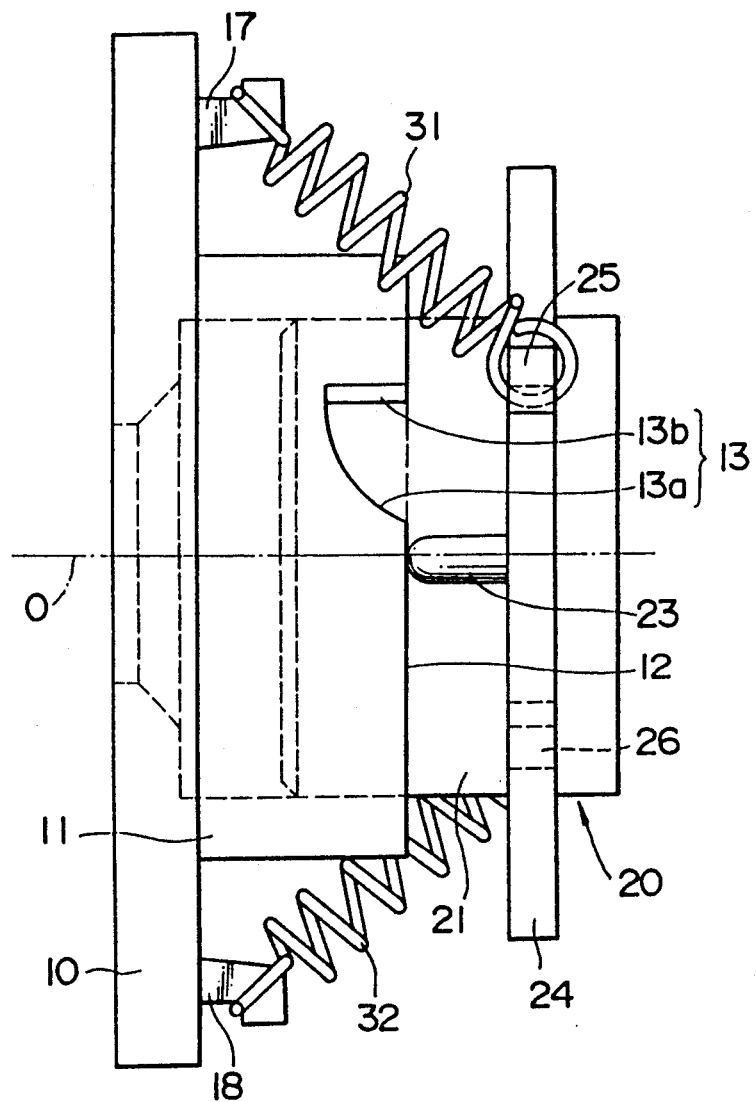
FIG. 3 is a side view showing a drawn-out (i.e., extended) condition of the lens.

In FIGS. 2 and 3, the details of the lens actuating member 20, the springs 31 and 32 and the cam mechanism are illustrated. FIGS. 2 and 3 show a drawn-in condition of the lens 22 and a drawn-out condition thereof, respectively.

As shown in FIG. 2, one end of each of the springs 31 and 32 are engaged with hooks 17 and 18, respectively, which are formed on the front surface of the base plate 10. The other ends of the springs 31 and 32 are coupled to the first and second arms 25 and 26, respectively, of the lens actuating member 20. That is, the central axis of each of the springs 31 and 32 and the optical axis are taken to the so-called twisted position or relation when the lens actuating member 20 is set in the initial position or it has been rotated in the counterclockwise direction.

As shown in FIGS. 2 and 3, the springs 31 and 32 are inclined with respect to the optical axis O by 45 degrees, when viewing the lens actuating member 20 from the side thereof, so that these urge the lens actuating member 20 to always contact the axial protrusions 23 with the front side surface of the supporting portion 11. More specifically, the axial protrusions always contact the flat surface 12 or the cam surfaces 13a of the supporting portion 11. Furthermore, the springs 31 and 32 simultaneously urge the lens actuating member 20 to rotate in the clockwise direction, when viewing the lens 22 from the front side.

When the lens drawing mechanism is not operated, and the lens actuating member 20 is biased by the springs 31 and 32 to be positioned in the most rotated position in the clockwise direction, the arm 28 of the lens actuating member 20 is engaged with the stopper member 19, and the axial protrusions 23 contact the corresponding cam surfaces 13a in the relatively deep position. Accordingly, the lens actuating member 20 is set to be in a drawn-in condition or status, as shown in FIG. 2.

When the protrusion of the lens drawing mechanism rotates the lens actuating member 20 in the counterclockwise direction through the third arm 27 in accordance with the result of measuring the distance between the camera and the object to be photographed, the axial protrusions 23 are displaced along the corresponding cam surfaces 13a toward the flat surface portion 12, and therefore, the lens actuating member 20 protrudes forwardly. FIG. 3 shows a drawn-out condition where the lens actuating member 20 protrudes the most. In the drawn-out condition, the axial protrusions 23 are engaged with the flat surface 12.

As described above in detail, in this embodiment, the lens actuating member 20 is urged along both of the directions of the optical axis of the lens 22 and the rotation of the lens actuating member 20 by the springs 31 and 32, so that it becomes unnecessary to use two kinds of springs as in the prior art. In other words, a single form of the springs 31 and 32 for urging the lens actuating member 20 in a direction inclined to the directions of the optical axis of the lens 22 and the rotation of the lens actuating member 20 is only required in this embodiment. That is, the present embodiment does not include a spring for urging the lens actuating member 20 only in the direction along the optical axis. According to this construction, it would be possible to shorten the total length of the lens part in the axial direction.

As a result, this embodiment can provide the lens position definition apparatus with the springs 31 and 32, which eliminate a space for arranging a spring for urging the lens actuating member 20 in a direction along the optical axis, thereby allowing the camera to be made more compact. In other words, the springs 31 and 32 of this embodiment can shorten the protrusion amount of the lens cover from the front surface of the main body, thereby allowing the camera to be made in more compact.

In this embodiment, furthermore, the springs 31 and 32 are coupled to the outer periphery of the lens 22 in the equiangular positions. Accordingly, the urging force applied to the lens actuating member 20 is balanced, so that the inclination of the lens actuating member 20 relative to the optical axis of the lens 22 is positively restrained.

It should be clear that the present invention is not limited to the embodiment described above, nor those illustrated in the drawings, and the invention can be modified without departing from the spirit and scope of the claimed invention.

For example, the lens position definition apparatus comprises two springs 31 and 32 in this embodiment. However, the present invention is not limited to this construction and it is possible to only comprise a sole spring 31 or 32 for urging the lens actuating member 20 to be inclined to the optical axis of the lens 22, or it is also possible to include more than two springs.

Furthermore, the cam surfaces 13a are formed on the front end surface of the supporting portion 11 and the axial protrusions 23 are provided on the outer circumferential surface of the cylinder portion 21 in this embodiment, however, the present invention is not limited to this construction and it is possible to provide the cam surfaces 13a on the outer circumferential surface of the cylinder portion 21 and to form the axial protrusions 23 on the front end surface of the supporting portion 11.

Furthermore, three cam surfaces 13a are provided in this embodiment. However, the present invention is not limited to this construction and it is possible that only one cam surface 13a be provided or two cam surfaces 13a are provided.

What is claimed is:

1. An apparatus for defining a position of a lens comprising:
   a base member;
   means for controlling a position of said lens relative to said base member along an optical axis of said lens in accordance with a rotational position of said lens about the optical axis, by urging said lens in a rotational direction, said controlling means further comprising means for urging said lens in a direction along said optical axis of said lens in association with said controlling means urging said lens in a rotational direction; and
   at least one spring comprising a coil spring for urging said lens in a direction inclined to the direction of said optical axis in a rotational direction opposite said rotational direction of urging by said controlling means, said at least one spring being tilted such that a central axis thereof is set to be inclined relative to both the directions of the optical axis and the rotation of said lens.

2. The apparatus according to claim 1, wherein said control means includes:
   a lens actuating member in which the lens is enclosed and which is movable along the optical axis of the lens and rotatable about the optical axis thereof; and
   a cam mechanism which is provided between the base member and the lens actuating member so as to regulate the position of the lens actuating member in the optical axis in accordance with a rotational position of the lens actuating member.

3. The apparatus according to claim 2, wherein
   said base member has a cylindrical supporting portion coaxial with the optical axis of the lens; and
   said lens actuating member has a cylinder portion fitted into said supporting portion and set to be slidable therein in the direction along the optical axis and rotatable about the optical axis.

4. The apparatus according to claim 3, wherein said cam mechanism includes:
   at least one axial protrusion formed on the outer peripheral surface of said cylinder portion; and
   at least one cam surface formed on a distal end surface of said supporting portion and being capable of engaging said axial protrusion.

5. The apparatus according to claim 4, wherein said axial protrusion is urged to contact said cam surface or the distal end surface by said spring.

6. The apparatus according to claim 5, wherein said cylinder portion further comprises connecting means which extends radially from said cylinder portion, said at least one spring being coupled to said connecting means and connected to said base member.

7. The apparatus according to claim 1, further comprising a plurality of said springs.

8. The apparatus according to claim 7, wherein each of said springs is tilted such that the central axis thereof is set to be inclined relative to both directions of the optical axis and the rotation of said lens.

9. The apparatus according to claim 7, wherein said springs are equiangularly arranged around the lens.

* * * * *